(12) United States Patent
Gaw et al.

(10) Patent No.: US 10,102,939 B2
(45) Date of Patent: Oct. 16, 2018

(54) CONDUCTIVE FIBER REINFORCED POLYMER COMPOSITION

(71) Applicant: The Boeing Company, Chicago, IL (US)

(72) Inventors: Kevin O. Gaw, Tukwila, WA (US); Eddie Kwon, Seattle, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 13/751,800

(22) Filed: Jan. 28, 2013

(65) Prior Publication Data

US 2014/0212620 A1 Jul. 31, 2014

(51) Int. Cl.
*H01B 1/20* (2006.01)
*C08J 5/10* (2006.01)
*B29C 70/88* (2006.01)
*B29C 70/02* (2006.01)

(52) U.S. Cl.
CPC ............. *H01B 1/20* (2013.01); *B29C 70/025* (2013.01); *B29C 70/882* (2013.01); *C08J 5/10* (2013.01); *Y10T 428/24* (2015.01); *Y10T 428/31623* (2015.04); *Y10T 428/31627* (2015.04); *Y10T 428/31645* (2015.04); *Y10T 428/31678* (2015.04); *Y10T 428/31688* (2015.04); *Y10T 428/31692* (2015.04); *Y10T 428/31725* (2015.04); *Y10T 428/31757* (2015.04); *Y10T 428/31761* (2015.04); *Y10T 428/31765* (2015.04); *Y10T 428/31859* (2015.04); *Y10T 428/31913* (2015.04); *Y10T 428/31946* (2015.04)

(58) Field of Classification Search
CPC .. C08L 77/06; C08K 3/04; C08K 7/14; C08K 2201/001; C08K 2201/004; C08J 2377/06; C08J 5/043; C08J 5/01; C08J 5/10; H01B 1/20; B29C 70/025; B29C 70/882
USPC .......................... 252/500, 511, 512; 264/104
See application file for complete search history.

(56) References Cited

U.S. PATENT DOCUMENTS

| | | | |
|---|---|---|---|
| 4,272,346 A | 6/1981 | Jakubowski et al. | 204/181 |
| 5,573,843 A | 11/1996 | Mitoh et al. | |
| 6,934,600 B2 * | 8/2005 | Jang et al. | 700/182 |
| 7,599,164 B2 | 10/2009 | Heeter et al. | 361/218 |
| 7,927,708 B2 * | 4/2011 | Mizrahi | 428/457 |
| 8,105,964 B2 * | 1/2012 | Cawse et al. | 442/61 |

(Continued)

FOREIGN PATENT DOCUMENTS

| | | |
|---|---|---|
| JP | 144767 A | 5/1974 |
| JP | 48461 A | 2/1995 |

(Continued)

OTHER PUBLICATIONS

Extended European Search Report, App. No. 13197580.7-1303 / 2759563 (dated 2014).

(Continued)

*Primary Examiner* — Camie S Thompson
(74) *Attorney, Agent, or Firm* — Walters & Wasylyna LLC (57) ABSTRACT

A conductive fiber reinforced polymer composition may include a composite structure having a longitudinal axis, a lateral axis, and a through axis, the composite structure including a polymer matrix, a conductive filler incorporated into the polymer matrix, and a reinforcing material incorporated into the polymer matrix.

20 Claims, 6 Drawing Sheets

(56) References Cited

U.S. PATENT DOCUMENTS

| | | | |
|---|---|---|---|
| 2004/0152829 A1* | 8/2004 | Tobita et al. | 524/595 |
| 2007/0001292 A1* | 1/2007 | Ohta | H01L 23/3733 257/718 |
| 2009/0117269 A1* | 5/2009 | Hansen | B29C 70/14 427/212 |
| 2011/0017867 A1* | 1/2011 | Simmons et al. | 244/1 A |
| 2012/0152611 A1 | 6/2012 | Fisher et al. | 174/653 |
| 2012/0282453 A1 | 11/2012 | Bradford et al. | 428/299.1 |
| 2013/0213685 A1* | 8/2013 | Gaw | 174/2 |

FOREIGN PATENT DOCUMENTS

| | | | |
|---|---|---|---|
| JP | 158443 A | 6/1998 | |
| JP | 231395 A | 10/2008 | |
| JP | 1388032 A | 6/2009 | |
| JP | 2009138032 | 6/2009 | |
| JP | 508416 A | 3/2010 | |
| WO | WO 2008/056123 | 5/2008 | |
| WO | WO 2009/118509 | 10/2009 | |
| WO | WO 2010/148383 | 12/2010 | |

OTHER PUBLICATIONS

Japanese Patent Office, Notice of Reasons for Rejection, App. No. 2014/010236 (dated Oct. 5, 2017).

Japanese Patent Office, English Translation of Notice of Reasons for Rejection, App. No. 2014/010236 (dated Oct. 5, 2017).

European Patent Office, Communication Pursuant to Article 94(3) EPC, Application No. 13 197 580.7 (dated Nov. 6, 2017).

European Patent Office, Communication Pursuant to Article 94(3) EPC, Application No. 13 197 580.7 (dated Jun. 16, 2017).

Japanese Patent Office, Decision of Rejection, Application 2014-010236, (dated Mar. 27, 2018).

Japanese Patent Office, English Translation of Decision of Rejection, Application 2014-010236, (dated Mar. 27, 2018).

European Patent Office, Communication Pursuant to Article 94(3) EPC, Application No. 13 197 580.7-1107 (dated Apr. 17, 2018).

* cited by examiner

CONDUCTIVE FIBER REINFORCED POLYMER COMPOSITION

FIELD

The present disclosure is generally related to fiber reinforced plastics and, more particularly, to a fiber reinforced polymer composition having an increased conductivity in directions orthogonal to the fiber plane.

BACKGROUND

The use of fiber reinforced plastic for various applications is well known. Due to their strength and lightweight, such compo sites are common in the aerospace, automotive, marine, and construction industries. Currently there is limited capacity for fiber reinforced plastics to conduct current in a direction orthogonal to the linear orientation of the primary fiber reinforcement.

Lack of sufficient conductivity, particularly in a through thickness (-z axis) direction (e.g., interplay direction) may result in large voltage potentials to build up within and on the surfaces of the fiber reinforced plastic. These voltages are relieved through energetic phenomena termed: "sparking," "edge glow" or "edge emission". This can be a significant concern, particularly in environments where fiber reinforced composites are used in flammable environments and where Federal regulations impose stringent standards on commercial aircraft. These regulations are directed toward reducing the possibility that fuel or fuel vapors in or around a fuel tank might be ignited by ignition sources such as electrical discharges or sparks. These discharges can be produced by the imposition of electrical potentials or currents, such as those generated by direct lightning strikes.

Lack of through thickness conduction of larger currents (i.e., current density) may result in the disassociation of the conductive carbon fibers from the matrix polymer during high current conduction due to excessive heating of the carbon fibers and surrounding matrix. In addition, the volumetric conduction of current may also induce the localized heating of composite surfaces, which can result in the ejection of particles. Particles that are near an edge of the fiber reinforced plastic articles may be of particular concern.

Standard practice could be to increase conductive filler content within the polymer matrix and on the surface of the layers of fiber reinforcement to reduce the voltage between the layers and to allow current pathways to exist in the orthogonal directions. A previous similar solution has been to incorporate metalized spheres within the polymer matrix. The metallization could be done using a conductive element, such as nickel. Such practices, however, have lacked uniformity of conduction throughout the composite structure toxicity of the metal, oxidation and sensitivity to moisture.

Accordingly, those skilled in the art continue with research and development efforts to overcome z-direction conductivity issues in the field of fiber reinforced plastics.

SUMMARY

In one embodiment, the disclosed conductive fiber reinforced polymer composition may include a composite structure having a longitudinal (x) axis, a lateral (y) axis, and a through (z) axis, the composite structure including a polymer matrix, a conductive filler applied to (e.g., or incorporated into) the polymer matrix, and a reinforcing (and, optionally, conductive) material trapped by the matrix.

In another embodiment, the disclosed conductive fiber reinforced polymer composition may include a composite structure having a longitudinal (x) axis, a lateral (y) axis, and a through (z) axis, the composite structure including a polymer matrix, at least one of a conductive mineral, a carbonaceous material, and a metal in the polymer matrix, and a fibrous reinforcing material.

In another embodiment, disclosed is a method for forming a conductive fiber reinforced polymer, the method may include the steps of: (1) providing a polymer matrix, (2) providing a conductive filler, and (3) using the conductive filler in the polymer matrix in a compounding process to form a conductive matrix.

In yet another embodiment, disclosed is a method for forming a conductive fiber reinforced polymer, the method may include the steps of: (1) providing a polymer matrix, (2) providing a conductive filler, (3) incorporation of the conductive filler to the polymer matrix forming a resin system of increased electrical conductivity, (4) providing a reinforcing material, and (5) applying the conductive matrix to the reinforcing material to form a composite structure.

Other aspects of the disclosed conductive fiber reinforced polymer composition will become apparent from the following detailed description, the accompanying drawings and the appended claims.

DETAILED DESCRIPTION

The following detailed description refers to the accompanying drawings, which illustrate specific embodiments of the disclosure. Other embodiments having different structures and operations do not depart from the scope of the present disclosure. Like reference numerals may refer to the same element or component in the different drawings.

Figure 1:
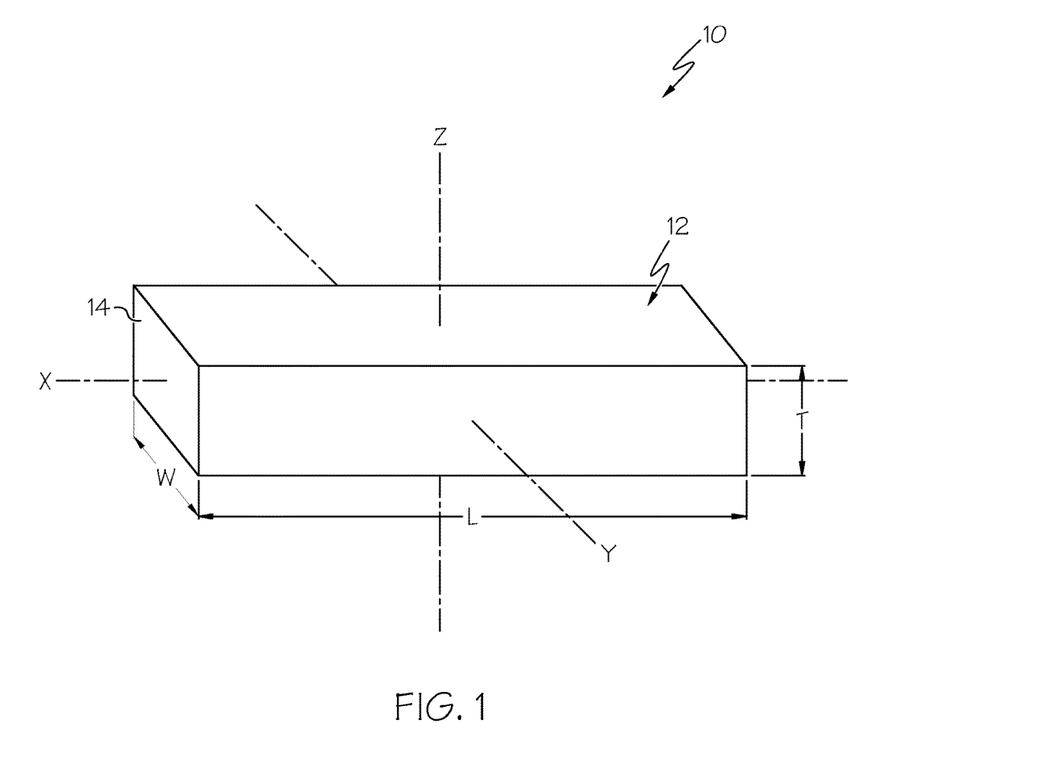
FIG. 1 is a perspective view of an embodiment of the disclosed conductive fiber reinforced polymer composition.
Figure 2:
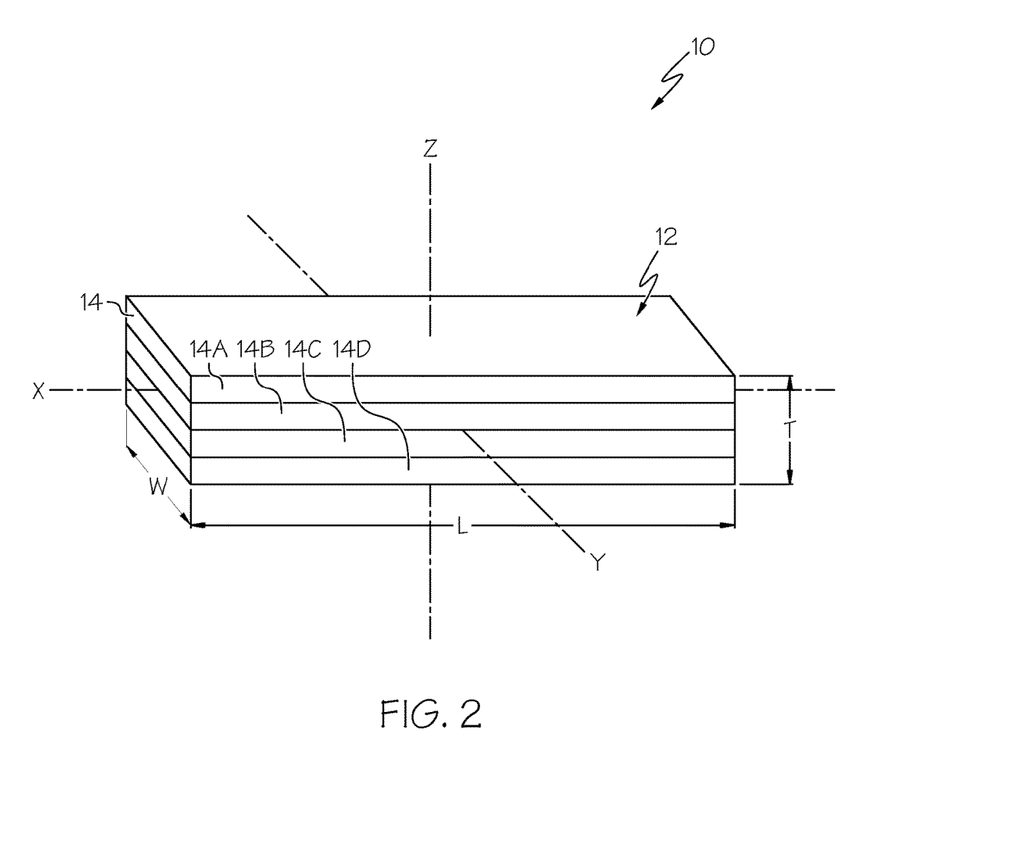
FIG. 2 is a perspective view of another embodiment of the disclosed conductive fiber reinforced polymer composition.

Referring to FIGS. 1 and 2, one embodiment of the conductive fiber reinforced polymer composition, generally designated 10, may include a composite structure 12 made up of constituent materials. The composite structure 12 may be formed of a single ply 14 (FIG. 1) or may be a laminate formed by a stacked assembly of a plurality of plies 14 (FIG. 2). The composite structure 12 may include a length L, a width W, and a through thickness T.

Figure 3:
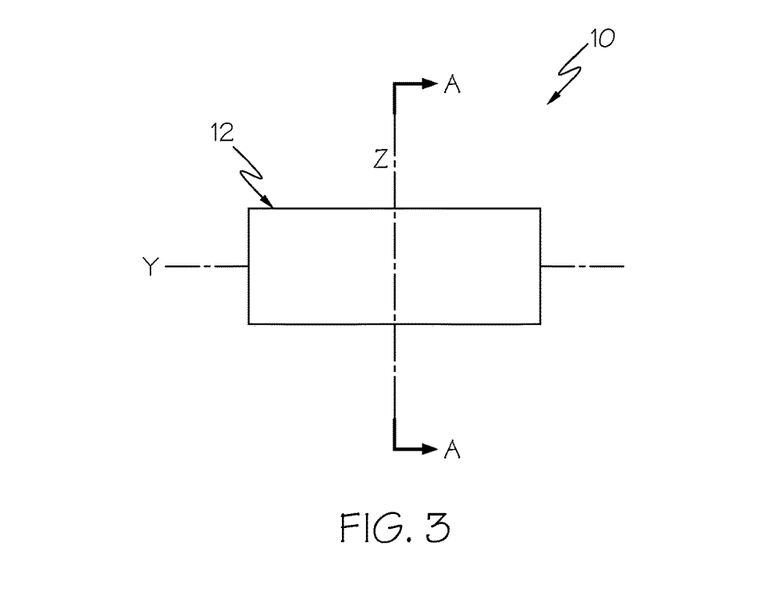
FIG. 3 is a front view of the disclosed conductive fiber reinforced polymer composition of FIG. 1.
Figure 4:
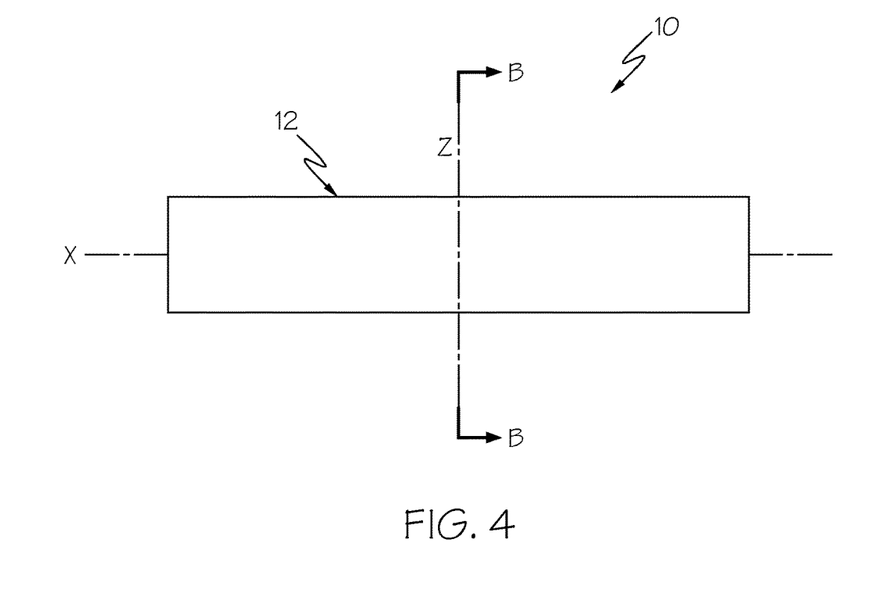
FIG. 4 is a side view of the disclosed conductive fiber reinforced polymer composition of FIG. 1.
Figure 5:
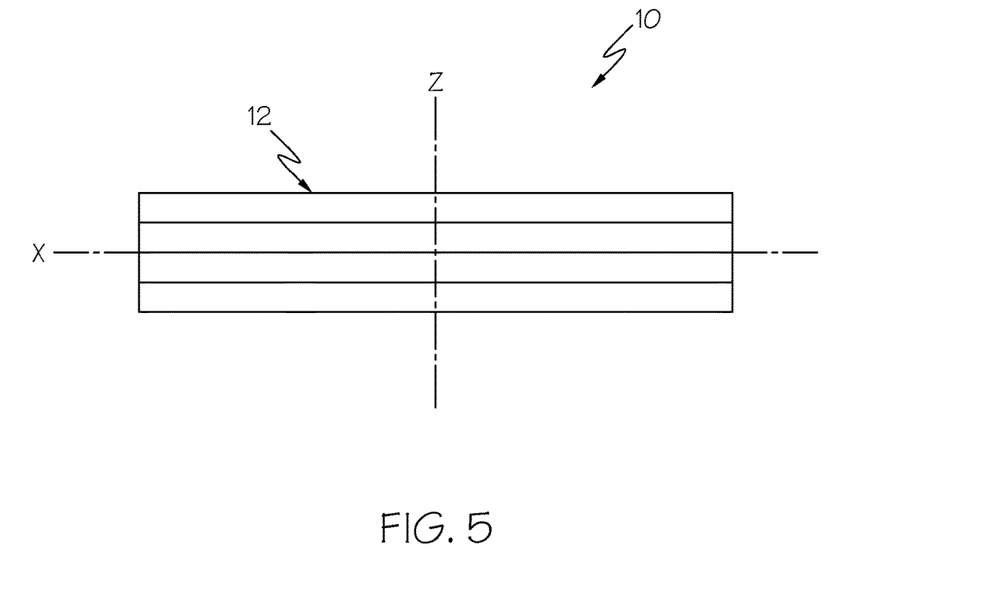
FIG. 5 is a side view of the disclosed conductive fiber reinforced polymer composition of FIG. 2.

Referring to FIGS. 3-5, a composite structure 12 having a single composite ply 14 may include a longitudinal axis X (i.e., length), a lateral axis Y (i.e. width), and a through axis Z (i.e., through thickness). Correspondingly, a composite structure 12 having a laminated stack of plies 14 may also include a longitudinal axis X, a lateral axis Y, and a through axis Z. It can be appreciated by one skilled in the art that the physical dimensions of the length L, width W, and through thickness T may vary depending upon final design and use criteria.

Figure 6:
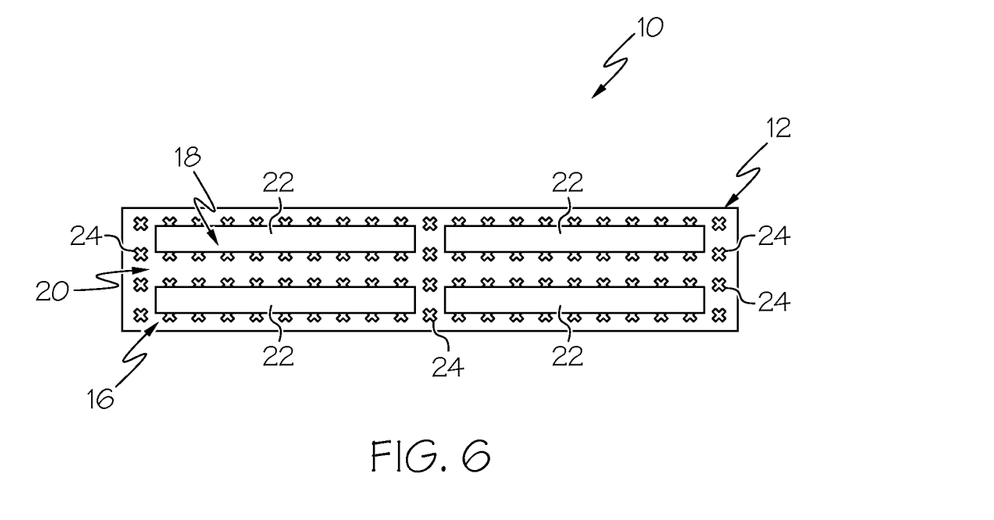
FIG. 6 is a cross sectional view of the disclosed conductive fiber reinforced polymer composition taken along section line A-A of FIG. 3.
Figure 7:
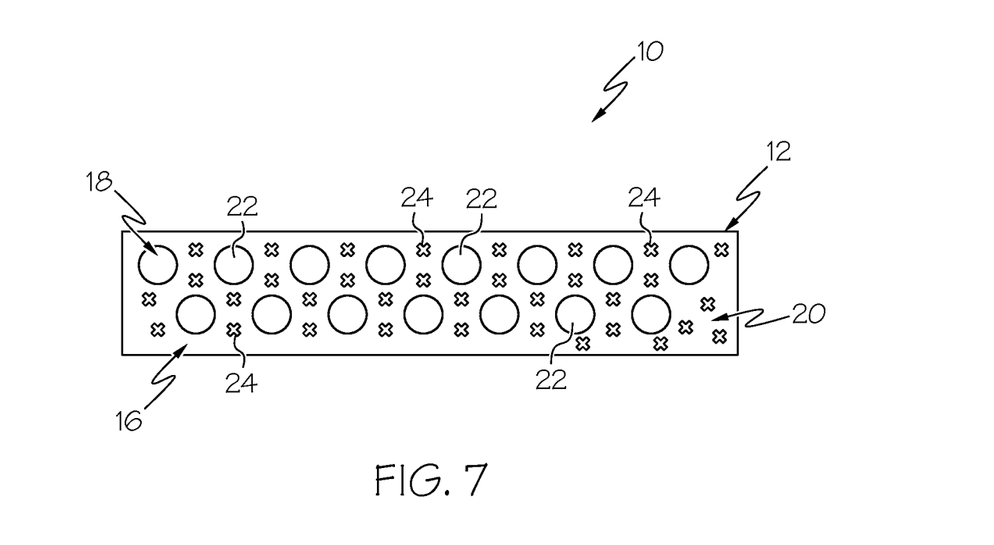
FIG. 7 is a cross sectional view of the disclosed conductive fiber reinforced polymer composition taken along section line B-B of FIG. 4; and, FIG. 8 is a flow chart illustrating an embodiment of the disclosed method of making a conductive fiber reinforced polymer composition.

Referring to FIGS. 6 and 7, the constituent materials of each ply 14 of the composite structure 12 may include a polymer matrix 16, a reinforcing material 18, and conductive filler 20. Additional constituents may be included without departing from the scope of the present disclosure.

The polymer matrix 16 may be a polymeric material selected from the group consisting of polyethersulfones, polyolefins, polyalkenes, polyamides, polypropylenes, polyaryletherketones, and polyphthalamides. For example, the polymer matrix 16 may be an epoxy resin, a vinylester or polyester thermosetting plastic resin, or phenol formaldehyde resin. The use of thermoplastics is also encompassed by the present disclosure. The molecular weight and relative viscosity of the polymer matrix 16 may incorporate a range suitable for stabilization of the reinforcement elements and the conductive fillers. In one implementation, the relative viscosity may be 1.0. In another implementation, the relative viscosity may be 2.0. In another implementation, the relative viscosity may be greater than 2.0 to provide suitable mechanical strength. The polymer matrix 16 may have a predetermined resistivity.

The reinforcing material 18 may be a short fiber-reinforced material or a continuous fiber-reinforced material. In one implementation, the reinforcing material 18 may include a plurality of reinforcing fibers 22. The fibers 22 may be selected from the group consisting of glass (e.g., fiberglass), carbon (e.g., carbon fiber; carbon nanotubes), and polymers including the polyaramids. The fibers 22 may be continuously aligned or randomly aligned. In another implementation, the reinforcing material 18 may include a reinforcing tape having a plurality (e.g., thousands) of fibers 22. The reinforcing tape may be unidirectional and may be woven, knit, braided or stitched tape. In another implementation, the reinforcing material 18 may be a hybrid that includes both reinforcing fibers 22 and reinforcing tape. The fibers 22 may have various lengths and diameters.

A single ply 14 may include fibers 22 oriented in a single direction (i.e., unidirectional) or in two directions (i.e., bidirectional; for example a woven fabric). As shown in FIGS. 6 and 7, for clarity of illustration, the fibers 22 of the single ply 14 are shown in a single direction. In a composite structure 12 having a plurality of plies 14, the direction of the fibers 22 can vary throughout the stack of plurality of plies 14 to give desired mechanical properties to the composite structure 12. The stacked composite material 12 may have any number of plies 14 layed and cured (or consolidated) in a particular designated stacking sequence.

The reinforcement fibers 22 may run parallel (uni/longitudinal, 0°), circumferentially (bi-axial, 90°), helically (biased, ±33° to 45°) or randomly along the length of the part. The orientation and type of fibers 22 may also be varied, producing a virtually isotropic laminate with equal strength in all directions. For example, the composite structure 12 illustrated in FIG. 2 may be a laminate having four plies (or lamina) 14A, 14B, 14C, 14D. The first ply 14A may have fibers 22 oriented longitudinally. The second ply 14B may have fibers 22 oriented forty-five degrees (45°) relative to the first ply 14A. The third ply 14C may have fibers 22 oriented ninety degrees (90°) relative to the first ply 14A. The fourth ply may have fibers 22 oriented forty-five degrees (45°) relative to the first ply 14A. It can be appreciated by one skilled in the art that while this symmetrical lay-up is typical for composite structures 12, other asymmetrical orientations may also be used.

The conductive filler 20 may include conductive particles 24 applied to (e.g., incorporated into) the polymer matrix 16 prior to its application to the reinforcing material 18. The conductive particles 24 may have any shape, such as small spheres, flakes, fibers, etc. In one expression, the conductive filler 20 may be selected from the group consisting of conductive minerals, carbonaceous materials, metals, conductive carbonaceous materials and combinations thereof. In another expression, the conductive filler 20 may be selected from the group consisting of exfoliated montmorillonite, carbon black, metal, graphite, and carbon. The conductive particles 24 may be processed (milled or chopped) to produce the conductive filler 20. The conductive filler 20 may be evenly distributed throughout the polymer matrix 16. For example, as illustrated in FIGS. 6 and 7, the conductive particles 24 may be evenly distributed throughout the longitudinal axis X, the lateral axis Y, and the through axis Z. The resulting composite structure 12 may have increased conductivity in all directions, but due to incorporation of the added conductive filler 20, conductivity along the through axis Z may be particularly enhanced.

When combined, the polymer matrix 16 and the added conductive filler 20 may form a conductive matrix having a specific targeted volumetric resistivity. For example, the conductive matrix may have a low volumetric resistivity. As one specific example, the conductive matrix may have a thermoplastic resistivity of approximately $10^4$ Scm. As another specific example, the conductive matrix may have a thermoplastic resistivity of approximately $10^9$ Scm. As yet another specific example, the conductive matrix may have a thermoplastic resistivity ranging from about $10^4$ to about $10^{10}$ Scm.

In one construction, the polymer matrix 16 may make up between 20% to 80% by weight of the composite structure 12. The conductive filler 20 may make up between 0.1% and 25% by weight of the composite structure 12. The reinforcing material 18 may make up between 10% and 80% by weight of the composite structure 12. In another construction, the polymer matrix 16 may make up between 20% to 80% by weight of the composite structure 12. The conductive filler 20 may make up between 0.1% and 25% by weight of the composite structure 12. The reinforcing material 18 may make up between 10% and 80% by weight of the composite structure 12. In yet another construction, the polymer matrix 16 may make up between 20% to 80% by weight of the composite structure 12. The conductive filler 20 may make up between 0.1% and 25% by weight of the composite structure 12. The reinforcing material 18 may make up between 10% and 80% by weight of the composite structure 12.

Optionally, the conductive matrix may also include a toughening agent added to the polymer matrix 16 during a compounding process, such as prior to the addition of the matrix to the reinforcing fibers. This toughening agent could contribute to the z-axis conductivity of the composite.

The composite structure 12 may be formed using any suitable manufacturing technique, including wet lay-up, spray-up, compression, injection, resin transfer, vacuum assisted resin infusion, or similar methods. Alternatively, each ply 14 may be ready-to-mold sheet of fiber reinforcing material 18 that has been pre-impregnated with resin, i.e., prepreg.

Figure 8:
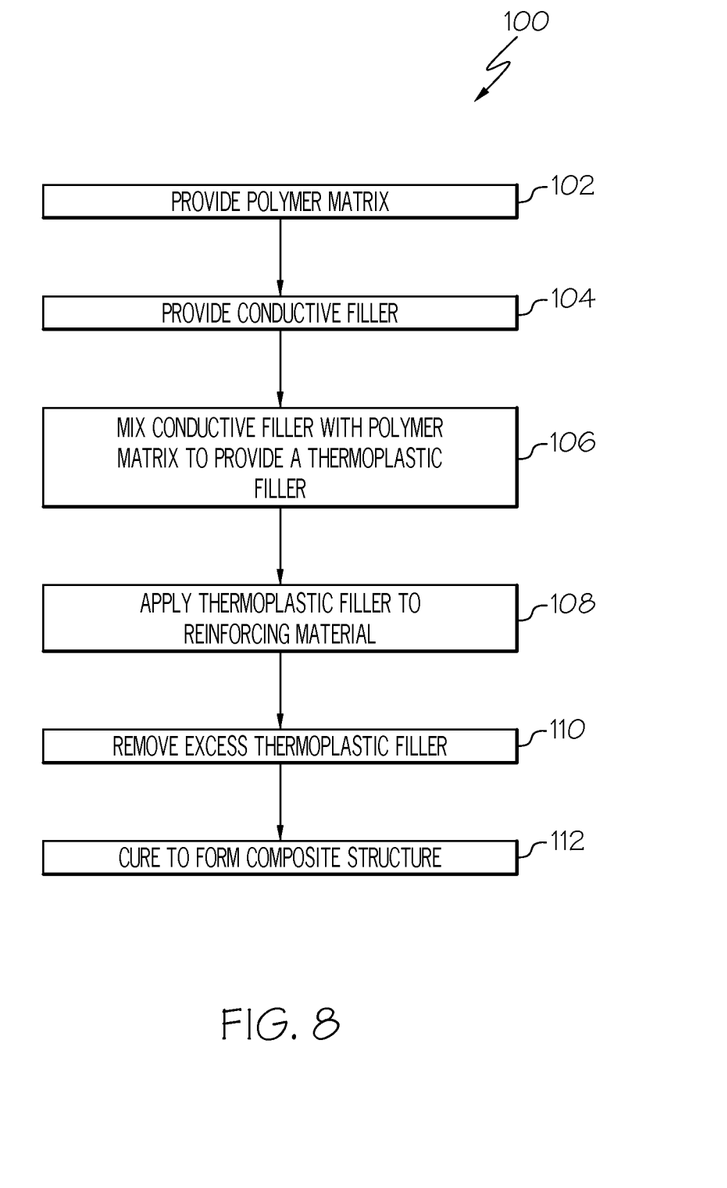

Referring to FIG. 8, also disclosed is a method, generally designed 100, for making a conductive fiber reinforced polymer composition. The method 100 may begin at block 102 with the step of providing a polymer matrix (e.g., resin). The polymer matrix may have a predetermined resistivity.

As shown at block 104, a conductive filler may be provided. As shown in block 106, the conductive filler may be mixed with the polymer matrix. The conductive filler may be added to the polymer matrix in any stage (e.g., a latter stage) of the compounding process. For example, the conductive filler may be added halfway through a compounding extruder screw. Application of the conductive filler at a latter stage may allow for incorporation of the conductive particles throughout the conductive matrix without degradation of the filler or the polymer matrix. Variations to this additive process may also provide for uniformity (or non-uniformity) of conductivity throughout the thermoplastic. The volumetric conductivity of the conductive matrix may be precisely controlled through materials choice and formation process.

As shown at block 108, the conductive matrix (i.e., the polymer matrix and conductive filler) may be applied to the reinforcing material to form the composite structure. For example, the reinforcing material may be a reinforcing tape, which is coated in a bath of conductive matrix. As shown at block 110, excess conductive matrix may be removed. As shown at block 112, the conductive matrix and reinforcing material may be allowed to cure (or consolidate in the case of thermoplastic polymer matrix materials) to form a composite structure 12.

Accordingly, the disclosed conductive fiber reinforced polymer composition may make use of a conductive filler applied to a polymer matrix to increase conductivity in the through axis Z of a composite structure. A uniformly distributed conductive filler may lead to a decrease in volumetric heating (through increased conductivity of the composite), leading to a reduction in particle ejection potential concomitant with the conductivity increase in the z and other axes.

Although various aspects of the disclosed conductive fiber reinforced polymer composition have been shown and described, modifications may occur to those skilled in the art upon reading the present disclosure. The present application includes such modifications and is limited only by the scope of the claims.

What is claimed is:

1. A conductive fiber reinforced polymer composition comprising:
    a composite structure comprising a longitudinal axis, a lateral axis, and a through axis, said composite structure comprising:
        an electrically conductive matrix comprising:
            a polymer matrix; and
            an electrically conductive filler comprising spherical electrically conductive particles of exfoliated montmorillonite mixed evenly throughout said polymer matrix; and
        a reinforcing material impregnated with said electrically conductive matrix,
        wherein all of said reinforcing material is aligned along a plane substantially parallel to at least one of said longitudinal axis and said lateral axis, and
        wherein said electrically conductive filler is evenly distributed throughout said electrically conductive matrix and throughout said reinforcing material along said through axis to enhance electrical conductivity of said composite structure along at least said through axis.

2. The composition of claim 1 wherein said electrically conductive filler further comprises at least one of electrically conductive minerals, electrically conductive carbonaceous materials, and electrically conductive metals.

3. The composition of claim 1 wherein said reinforcing material comprises at least one of glass, fiberglass, carbon, carbon fiber, polyaramid, and carbon nanotubes.

4. The composition of claim 1 wherein said reinforcing material comprises reinforcing fiber tape.

5. The composition of claim 1 wherein said electrically conductive filler makes up between 20 percent and 25 percent by weight of said composite structure.

6. The composition of claim 1 wherein said polymer matrix comprises at least one of polyethersulfones, polyolefins, polyalkenes, polyamides, polypropylenes, polyaryletherketones, and polyphthalamides.

7. The composition of claim 1 wherein said composite structure comprises a composite ply.

8. The composition of claim 1 wherein said composite structure comprises a laminated stack of a plurality of composite plies.

9. The composition of claim 1 wherein substantially all of said reinforcing material is aligned along a plane substantially parallel to only said longitudinal axis.

10. The composition of claim 1 wherein substantially all of said reinforcing material is aligned along a plane substantially parallel to only said lateral axis.

11. The composition of claim 1 wherein said electrically conductive filler further comprises a thermoplastic toughening agent.

12. The composition of claim 1 wherein said electrically conductive matrix comprises a volumetric resistivity of at least approximately $10^4$ Scm.

13. A method of forming a conductive fiber reinforced polymer, said method comprising the steps of:
    providing a polymer matrix;
    providing an electrically conductive filler comprising spherical electrically conductive particles of at least one of exfoliated montmorillonite and carbon black;
    mixing said electrically conductive filler evenly within said polymer matrix in a compounding process to form an electrically conductive matrix;
    providing a reinforcing material; and
    impregnating said reinforcing material with said electrically conductive matrix to form a composite structure, said composite structure comprising a longitudinal axis, a lateral axis, and a through axis;
    wherein all of said reinforcing material is aligned along a plane substantially parallel to said longitudinal axis and said lateral axis of said composite structure, and
    wherein said electrically conductive filler is evenly distributed throughout said polymer matrix and throughout said reinforcing material along said through axis to enhance electrical conductivity of said composite structure along at least said through axis.

14. The method of claim 13 wherein said composite structure comprises low volumetric resistivity for directions substantially perpendicular to said reinforcing material.

15. The method of claim 13 wherein said electrically conductive matrix conducts electricity along at least said through axis.

16. The method of claim 13 wherein said electrically conductive filler is introduced to said polymer matrix in a latter stage of said compounding process.

17. The method of claim 13 wherein said electrically conductive filler further comprises at least one of electrically conductive minerals, electrically conductive carbonaceous materials, and electrically conductive metals.

18. The method of claim 13 wherein said electrically conductive matrix comprises a volumetric resistivity of at least approximately $10^4$ Scm.

19. A conductive fiber reinforced polymer composition comprising:
  a composite structure comprising a longitudinal axis, a lateral axis, and a through axis, said composite structure comprising:
    an electrically conductive matrix comprising:
      a polymer matrix; and
      an electrically conductive filler comprising spherical electrically conductive particles of carbon black mixed evenly throughout said polymer matrix; and
    a reinforcing material impregnated with said electrically conductive matrix,
  wherein all of said reinforcing material is aligned along a plane substantially parallel to at least one of said longitudinal axis and said lateral axis, and
  wherein said electrically conductive filler is evenly distributed throughout said electrically conductive matrix and throughout said reinforcing material along said through axis to enhance electrical conductivity of said composite structure along at least said through axis.

20. The composition of claim 19 wherein said reinforcing material comprises at least one of glass, fiberglass, carbon, carbon fiber, polyaramid, and carbon nanotubes.

* * * * *